July 31, 1962     G. E. FIESER     3,047,837

SINGLE PEN, MULTICHANNEL RECORDING OR INDICATING METER

Filed Jan. 14, 1959     2 Sheets-Sheet 1

INVENTOR.
GARLAND E. FIESER
BY
Bruno C. Lechler
ATTORNEY

July 31, 1962  G. E. FIESER  3,047,837
SINGLE PEN, MULTICHANNEL RECORDING OR INDICATING METER
Filed Jan. 14, 1959  2 Sheets-Sheet 2
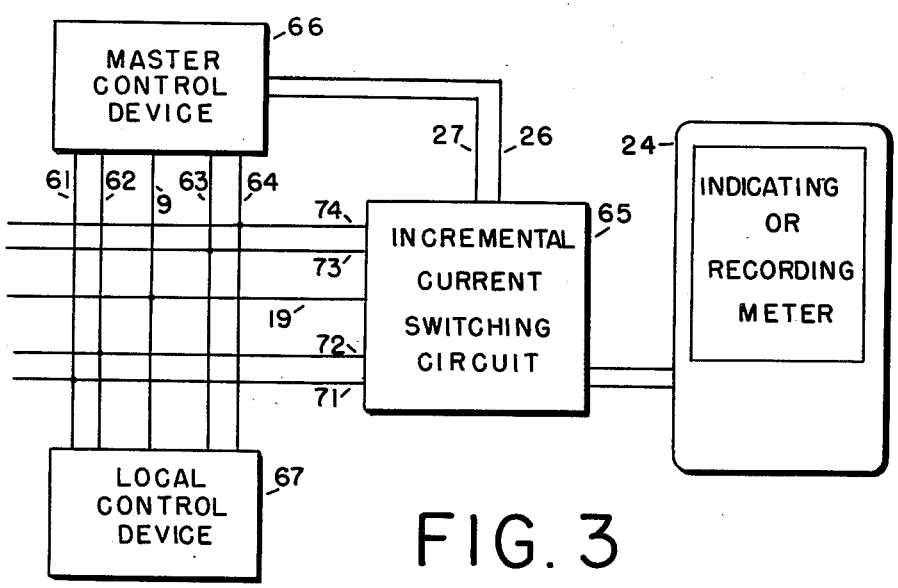
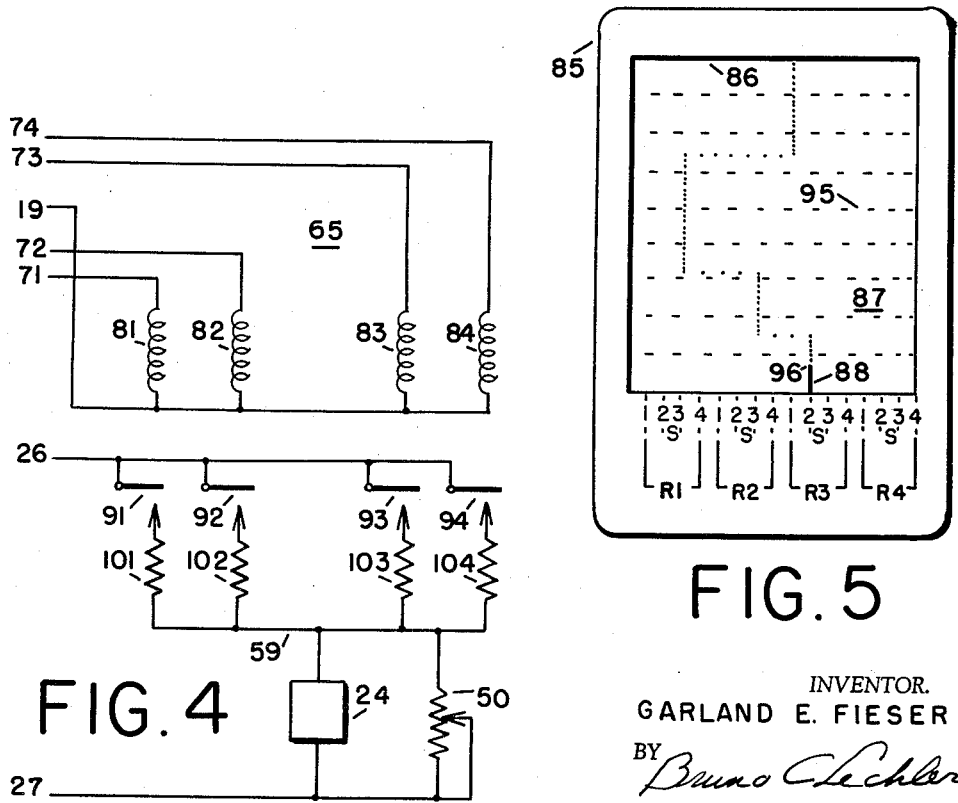
INVENTOR.
GARLAND E. FIESER
BY
ATTORNEY

3,047,837
SINGLE PEN, MULTICHANNEL RECORDING OR INDICATING METER
Garland E. Fieser, East Moline, Ill., assignor, by mesne assignments, to The Gamewell Company, Newton, Mass., a corporation of Delaware
Filed Jan. 14, 1959, Ser. No. 786,779
6 Claims. (Cl. 340—22)

This invention relates to a system for recording or indicating the simultaneous condition of a plurality of independently variable devices such as switches, levers, valves or the like by a single pointer on a single scale.

In many fields of activity it is important to know the simultaneous relative condition of a plurality of control devices and to have a permanent record thereof.

For example, in the field of integrated traffic control within a city, it is desirable to know at any instant and to have a record of the position of the master traffic control devices such as the cycle length selector, the traffic cycle offset selector, and the cycle split selector. The record is useful to the maintenance man in determining whether the equipment is functioning properly, and to the traffic engineer in routing traffic or in setting up a programmed portion of the traffic cycle pattern.

Traffic cycle length is defined as the duration of one complete change of the traffic signals; cycle split is defined as the proportion of the cycle allotted to a main street and to a cross street; and offset or reset are defined as the delay in the initiation of a cycle at a given intersection with respect to a master intersection.

The invention provides means for indicating and/or recording on a single meter the simultaneous condition of a plurality of multiposition controls. This is accomplished by applying to the meter increments of current which vary in multiples of one increment for each condition of one control device, and in multiples of another increment for each condition of another control device. The increments for each condition of the two control devices are so selected that no two combinations of conditions of the control devices can produce the same total current. It may be desired to know which one of four splits and which one of four offsets is in effect at a given time. The circuit disclosed herein would be controlled by the split selector and the offset selector and, in conjunction with a known meter, provide the indications desired.

Assume for example that the apparatus to be monitored provides a choice of one of four splits simultaneously with one of four offsets, or sixteen combinations. The four splits may be assigned current values of 0, 1, 2, 3 milliamperes, and the four offsets may be assigned current values of 0, 4, 8, 12 milliamperes. The splits may be termed S1, S2, S3, S4 and the offsets or resets R1, R2, R3, R4. Then, if the meter reads zero, it is known that split S1 and offset R1 are in effect. If the meter reads 5, it is known that split S2 and offset R2 are in effect because only one possible combination of the above named values of current 1 and 4, totals 5. A scale is provided on the meter so that the meter pointer permits reading the splits and offsets directly.

In the form of the invention described above it is assumed that a master controller controls a plurality of local controllers over a multi-conductor cable, one of four conductors controlling each of the four splits and one of a second group of four conductors controlling each of the four offsets. Each of these conductors controls a current switching circuit associated with the meter.

In another form of the invention each of the groups of four conductors is reduced to two and a binary type relay circuit employed to obtain the four splits and a second binary type relay circuit used to obtain the four offsets.

In a binary type circuit two relays are energized or de-energized to obtain four conditions. When neither relay is energized a first condition is obtained; with only the first relay energized a second condition results; with only the second relay energized a third condition results, and with both energized a fourth condition is obtained. In this form of the invention the two pairs of control conductors energize relays which switch increments of current to the meter which indicates and records the condition of the conductors in terms of the end result. The meter indicates which one of four splits and which one of four offsets is in effect at all times.

In a third form of the invention, the meter is located within the master controller and the relays within the split and offset selectors which energize the interconnecting conductors also switch incremental currents to the indicating or recording meter. Each different position of the meter pointer traces on a slowly moving chart a single line indicative of the different combinations of the split and offset selectors and is read on a scale below the face of the meter.

Binary control circuits may also be employed with the third form of the invention. Two pairs of conductors control the two local devices into one of four conditions each. Two relays are employed for each control function at the local controllers: when neither is energized a first condition exists, when only one is energized a second condition is effected, when only the other is energized a third condition is effected, and when both are energized a fourth condition is put into effect. The increments of current applied to the meter by this form of the invention would be for example 1 milliampere when the first split selector relay is energized and 2 milliamperes when the second split selector relay is energized, 4 milliamperes when the first offset selector relay is energized and 8 milliamperes when the second offset relay is energized. It can be seen that this is a geometric progression. The progression may not be geometric for other combinations.

The novelty of the invention resides in the assignment of different increments of current to different conditions of two or more control functions. The increments are selected to be non-conflicting. Each of the combinations of increments is read directly on the meter.

In this example, the ammeter chart is divided into 16 divisions with each division representing a position of the offset selector and the cycle split selector. Another device, a cycle length selector, may have up to 16 positions and requires an individual recorder. Two devices each having 4 positions or a total of 16 combinations require one recorder. Four devices each having two positions or a total of 16 combinations require only one recorder. Of course, the ammeter chart may be divided into more or fewer channels. Legibility is decreased or improved accordingly.

The principal object of the invention is to provide a circuit which converts a single channel indicating or recording ammeter to use as a multichannel indicator.

Another object of the invention is to feed to an ammeter multiples of one increment of current indicative of the one of the variables selected from a first group, and multiples of a larger increment of current indicative of the variables selected from a second group, the increments of current for the second group being larger than the sum of all the increments used for the first group.

Another object is to provide a circuit consisting of current admitting paths which are switched to permit incremental current flows representative of the position of two or more load devices.

Another object is to provide a circuit to add in an ammeter increments of current representative of the condition of each of two pairs of conductors controlling two load devices.

Another object is to provide a circuit which switches to a meter incremental currents indicative of the condition of two groups of four conductors each, each group controlling the position of a load device.

Another object is to secure from a single recording ammeter a record of the setting of a plurality of devices at any given past instant and the times when those settings were changing.

Another object is to provide a circuit to switch geometric increments of current representative of the condition of four conductors controlling a device through sixteen positions.

The functioning of the circuit and meter will be described with reference to the following drawings, in which—

FIGURE 3 shows a form of the invention comprising a master control device, two pairs of conductors to a local control device, a modified form of the switching circuit, and a meter.

FIGURE 4 is a circuit diagram of a modified form of the incremental current switching circuit.

FIGURE 5 shows a front view of a recording meter.

Figure 1:
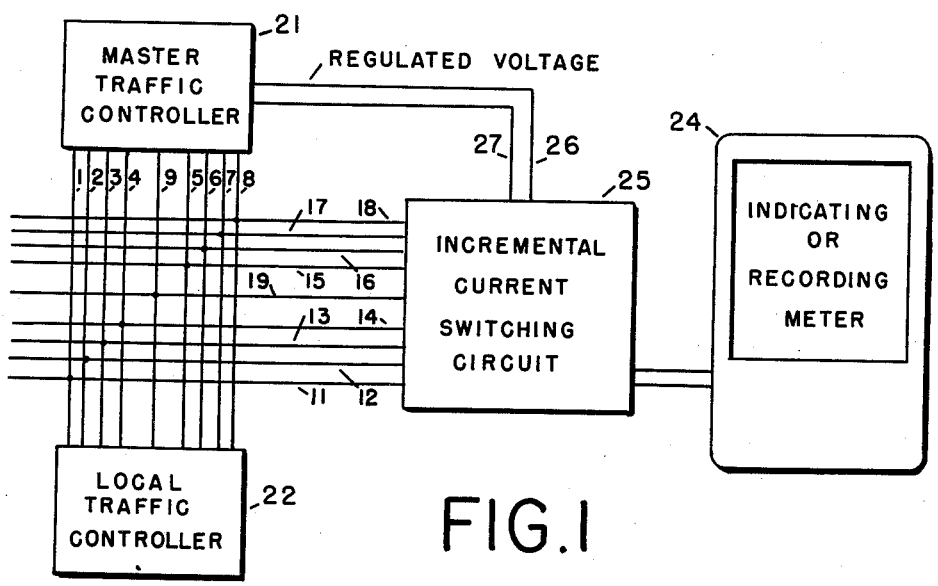
FIGURE 1 shows the invention comprising a master control device, a number of conductors to a local control device, an incremental current switching circuit and an indicating or recording meter.

The basic form of the invention is shown in FIGURE 1. The numeral 21 indicates the control device which it is desired to monitor. The control device 21 may be a master traffic controller, for example. Its purpose is to control a group of local traffic controllers 22, only one of which is shown, over a group of interconnecting conductors 1–8 and a common return conductor 9. The indicating or recording ammeter 24 is shown connected to minotor the individual conductors 1–8 through an incremental current switching circuit 25, which is the subject of the present invention. The switching circuit 25 is connected to each of the interconnecting conductors 1–8 through sampling conductors 11–18 and common return 19, and receives regulated voltage over conductors 26, 27 from a regulated power supply which may be located within the control device 21. A well regulated supply is necessary to maintain the accuracy of the system.

Figure 2:
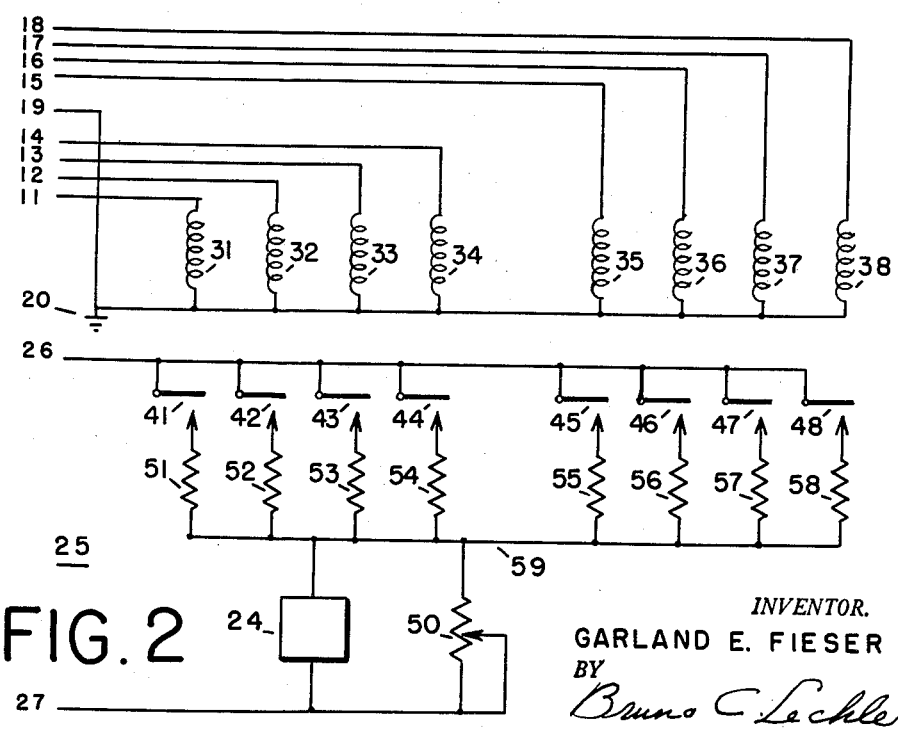
FIGURE 2 is a circuit diagram showing the circuit for switching the incremental currents.

A wiring diagram of the switching circuit for this form of the invention is shown in FIGURE 2. Conductors 11–18 are shown connected to the coils 31–38 respectively, of a group of identical relays. The other end of each relay coil is connected to a common return 19 or to ground 20. Each relay 31–38 controls one normally open contact pair 41–48 respectively, which when closed apply power from line 26 through resistors 51–58, respectively, to the common line 59 and thence to meter 24. The return line from the meter is connected through line 27 to the regulated power supply. A variable resistor 50 is connected in parallel with meter 24 for calibration purposes.

The control conductors 1–8 are arranged in two groups 1–4 and 5–8 corresponding to different control functions. For example, conductors 1–4 may control the traffic cycle split and conductors 5–8 may control the traffic cycle offset. Only one split and one offset may be in effect at a time. Thus only one conductor of each group is energized at a time. The values of resistors 51–58 are chosen so that incremental values of current will flow in each of the parallel circuits and add through meter 24 as succeeding relays are energized.

Assume that conductors 1–4 control the split function and conductors 5–8 control the offset function. Relay contacts 41–44 would then control the amount of current flowing through meter 24 to indicate the split and relay contacts 45–48 would control the indication of the offset. Resistors 51–54 would be selected to admit 1, 2, 3, 4 milliamperes, respectively for example, and resistors 55–58 to admit 1, 5, 9, 13 milliamperes, respectively. Thus, with split S1 and offset R1 in effect, two milliamperes of current would flow and the pointer would reside at indication S1, R1. If split S2 and offset R2 were in effect, 2 plus 5 or 7 milliamperes would flow and the pointer would reside over indication S2, R2. Since only one split control conductor 1–4 and only one offset conductor 5–8 are energized at any time, the current values add in the meter 14 and the total can be read directly. Currents representative of cycle split move the pointer in small increments and currents representative of cycle offsets move the pointer in large increments. The scale below the pointer is calibrated accordingly.

Table I below shows for each condition of the split control conductors 1–4 and the offset control conductors 5–8 the current flowing through each half of the circuit 51–54 and 55–58, and through the meter 24.

TABLE I

*Current Through Meter 24*

| Split | S1 | S2 | S3 | S4 | S1 | S2 | S3 | S4 | S1 | S2 | S3 | S4 | S1 | S2 | S3 | S4 |
|---|---|---|---|---|---|---|---|---|---|---|---|---|---|---|---|---|
| Current | 1 | 2 | 3 | 4 | 1 | 2 | 3 | 4 | 1 | 2 | 3 | 4 | 1 | 2 | 3 | 4 |
| Offset | R1 | R1 | R1 | R1 | R2 | R2 | R2 | R2 | R3 | R3 | R3 | R3 | R4 | R4 | R4 | R4 |
| Current | 1 | 1 | 1 | 1 | 5 | 5 | 5 | 5 | 9 | 9 | 9 | 9 | 13 | 13 | 13 | 13 |
| Total | 2 | 3 | 4 | 5 | 6 | 7 | 8 | 9 | 10 | 11 | 12 | 13 | 14 | 15 | 16 | 17 |

Another form of the invention is shown in FIGURE 3. The incremental switching circuit 65 is designed to be used with a two-wire binary control system. The master control device 66 controls each local device 67 over two pairs of conductors 61, 62 and 63, 64 and a common return 9. Each of the conductor pairs controls one function at the local device 67 through the use of relays and contacts urged into one of four positions. For example with both conductors 61, 62 deenergized a first split S1 may be effective; with only conductor 61 energized a second split S2 may be effective; with only conductor 62 energized a third split S3 is effective, and with both conductors 61, 62 energized a fourth split S4 is effective. The same conditions of the offset control conductors 63, 64 effect changes in offset. Other portions of the circuit are similar to that shown in FIGURE 1.

The wiring diagram for the switching circuit 65 is shown in FIGURE 4. Conductors 71–74 are connected to sample the potential on control conductors 61–64, respectively. Conductors 71–74 each feed a solenoid coil 81–84, respectively. The other lead for each solenoid coil is connected to a common return 19 or to ground. Each solenoid coil controls a normally open contact pair 91–94, respectively. Each movable contact is connected to line 26 from the regulated power supply. In series with each normally open contact 91–94 is a resistor 101–104; the other terminal of each resistor is connected to a common line 59. Meter 24 is connected between line 59 and the return supply conductor 27 to the regulated power supply. A variable resistor 50 is connected in parallel with meter 24 for calibration purposes.

It can be seen that when voltage is applied to any of the control conductors 61–64 current will flow over corresponding conductors 71–74 and energize relay coils 81–84. When any of the relays coils 81–84 are energized they will close their corresponding contacts 91–94 and permit current to flow over one or more resistors 101–104 and through meter 24.

Assume for example that split S2 and offset R2 are in effect because conductors 61 and 63 are energized. Relay coils 81 and 83 will be energized over lines 71 and 73, respectively, and contacts 91 and 93 will be closed permitting current to flow through resistors 101 and 103 and thence through meter 24. The currents will add in meter 24 and cause its pointer to move to the position over the scale registering S2 and R2. If split S1 and offset R1 are in effect, none of the control conductors 61–64 will be energized and none of the relays 61–64 energized. No current will flow through meter 24 and its pointer will register zero or split S1 and offset R1.

Table II below shows for each condition of the split control conductors 61, 62 and the offset control conductors 63, 64 the current flowing through each half of the circuit 101—102 and 103—104, and through the meter 24.

TABLE II

*Current Through Meter 24*

| Split | S1 | S2 | S3 | S4 | S1 | S2 | S3 | S4 | S1 | S2 | S3 | S4 | S1 | S2 | S3 | S4 |
|---|---|---|---|---|---|---|---|---|---|---|---|---|---|---|---|---|
| Current | 0 | 1 | 2 | 3 | 0 | 1 | 2 | 3 | 0 | 1 | 2 | 3 | 0 | 1 | 2 | 3 |
| Offset | R1 | R1 | R1 | R1 | R2 | R2 | R2 | R2 | R3 | R3 | R3 | R3 | R4 | R4 | R4 | R4 |
| Current | 0 | 0 | 0 | 0 | 4 | 4 | 4 | 4 | 8 | 8 | 8 | 8 | 12 | 12 | 12 | 12 |
| Total | 0 | 1 | 2 | 3 | 4 | 5 | 6 | 7 | 8 | 9 | 10 | 11 | 12 | 13 | 14 | 15 |

It is to be noted that the arrangement of current paths shown in FIGURE 4 is different from that shown in FIGURE 2. In the circuit illustrated in FIGURE 4 current may flow in all four paths simultaneously. Resistors 101 to 104 are selected to admit 1, 2, 4, and 8 milliamperes, respectively, for example. When current flows through all the paths it totals 15 milliamperes or full scale reading. It is evident that any combination or total of currents indicative of split (0, 1, 2, 3 milliamperes) cannot be confused with any combination or total of currents indicative of offset (0, 4, 8, 12). A geometric progression of resistance values is utilized here.

The circuits disclosed herein may be used with either an indicating or a recording ammeter. The circuits may also be revised to add voltages rather than currents in which case a recording or indicating voltmeter may be used. An example of the meter is shown in FIGURE 5. A recording type meter is shown because it gives both an instantaneous and a recorded reading.

One form of chart recorder is shown in FIGURE 5. The numeral 85 designates a housing having a rectangular opening 86 having a transparent cover. A chart 87 moves upward in front of the opening from one storage reel to another in the usual manner. A pen 88 marks the sensitized paper chart 87; movement of the chart under the pen leaves a vertical trace indicating the condition of the control circuits. Horizontal time delineations 95 on the chart 87 serve to indicate when the changes in the trace were made. When a new chart is inserted in the recorder the time line 96 at which the pen is marking is synchronized with the actual time. The chart is driven by synchronous clockwork and maintains correct time.

A plurality of letter or numerical designations may be inscribed above or below the window 86 in line with their corresponding position. For example, the chart may be divided into four areas labeled R1, R2, R3, R4. Each of these areas is subdivided into four smaller areas S1, S2, S3, S4. For example, when the trace occurs over the designation S2, R3 as shown in FIGURE 5 it indicates that split S2 and offset R3 is in effect.

A complete graphic record of two functions varying through sixteen combinations is available on a single chart. The chart may be preserved indefinitely for future study.

It is understood that one may modify the invention by using a recording voltmeter and employ incremental voltages to step the meter to its various indicating positions. A tapped voltage supply would be switched to the meter registering the various combinations.

It is also understood that the invention may be modified by the addition or deletion of current paths with subsequent expansion or contraction of the recording chart. Also, that a recording need not be made but instantaneous values observed to indicate whether the master controller is operating. None of the modifications departs from the spirit of the invention as set forth in the appended claims.

It is also understood that the meter movement will have to be adjusted when it is initially connected to the current switching circuit. When used with the circuit shown in FIGURE 2, current flows when split S1 and offset R1 are in effect. When used with the circuit shown in FIGURE 4, no current flows when split S1 and offset R1 are in effect. The meter movement is adjusted accordingly.

I claim:

1. A circuit for use with a recording ammeter to adapt the ammeter for use as a monitor of the control positions of devices controlled by a master control device, comprising: a master control device having conductor energizing means; a plurality of conductors leading away from said master and energizable thereby adapted to be connected to units controlled by said master control device, said conductors divided into two groups, the first of said groups transmitting instructions relating to a first control function, and the second of said groups transmitting instructions relating to a second control function, and each conductor in said first group corresponding to a different control position of said first control function, and each conductor in said second group corresponding to a different control position of said second control function; a like plurality of electric paths, said electric paths divided into two groups corresponding to the two said groups of said conductors, the electric paths of the first group connected to the conductors of said first group of conductors, and the electric paths of said second group connected to the conductors of said second group of conductors, whereby each electric path may receive current from the conductor to which it is connected when said conductor is energized by said master; a stable impedance in each electric path, the impedances in said first group of electric paths differing from each other in values to permit successively larger flows of current to said ammeter related in arithmetic progression, and the impedances in said second group also differing from each other in values to permit successively larger flows of current to said ammeter related in arithmetic progression, with the largest flow of current from the electric paths of said first group being smaller than the smallest flow and smallest increment of current from the electric paths of said second group; an output circuit connected to receive the output of each of the electric paths, said output carried by said output circuit consisting of the current carried by any energized electric path in one group and the current of any energized electric path in the second group; a recording ammeter connected to said output circuit; and means forming a part of said ammeter for recording the current value received by said ammeter from said output circuit.

2. Apparatus for indicating the control condition, simultaneously, of a plurality of control devices, including, in combination: a recording ammeter; a plurality of current paths connected to said recording ammeter; a switch in each of said paths; means controlling each of said plurality of control devices through a plurality of conditions, and each said switch also controlled by said controlling means into a like plurality of conditions; means in each current path limiting the current therethrough, said current limiting means arranged in a plurality of groups, each of said current limiting means in each of said groups having a value of impedance related in arithmetic progression; an output circuit connected to receive the total current from each of said current paths, said total current comprising current received simultaneously from at least one path of one of said groups, and current from at least one path of the other of said groups; said ammeter connected to said output circuit for receiving said total current; and means forming a part of said ammeter including a scale having equally spaced designations indicating said plurality of control conditions of said plurality of control devices.

3. In a traffic control system in which a master controller determines the operation of local controllers through the actuation of one of several primary circuits in each of two groups of circuits connecting said master and said local controllers, the improvement comprising: a monitoring system, including: an ammeter; a plurality of relays, individual ones of said relays being connected respectively to said individual primary circuits, each of said relays having contacts closed when its primary circuit is energized; a like plurality of secondary circuits, each one of said secondary circuits completed by said relay contacts when said contacts close, said secondary circuits connected together to form an output circuit, said output circuit connected to said ammeter; an impedance in each secondary circuit adapted to permit a finite amount of current flow through each secondary circuit, said amount of current being different for each secondary circuit in the first group and for each secondary circuit in the second group, the amounts of current adapted to be passed by said second group being greater than by said first group, and the current transmitted by said output circuit to said ammeter representing the sum of current received simultaneously from one secondary circuit in one of said two groups and one secondary circuit in the other of said two groups; the values of said impedances being selected to provide a distinct total current for each combination of one current from the first group and one current from the second group; and means forming a part of said ammeter including a scale having designations indicating the nature of the operation of said local controller being controlled by said master controller.

4. A switching circuit for use in conjunction with a recording ammeter monitoring the condition of a master traffic control device which controls the simultaneous condition of a plurality of functions within a plurality of local traffic control devices over two or more pairs of conductors, each pair assigned to the control of a different function, comprising: a plurality of pairs of relays, each relay connected to a control conductor and energized therefrom when said control conductor is energized; a pair of contacts on each relay closed when the relay is energized; a source of regulated power applied to one contact of each of said contact pairs; a plurality of impedance elements each having one terminal connected to a common line and another terminal connected to the other contact of each of said contact pairs; a recording ammeter; a current movement therein connected between said common line and having a return circuit to said power source, the value of each of said impedances selected to apply respective currents to said movement which vary in geometric progression; and an indicator forming a part of said movement stepped in equal distinguishable increments indicative of the condition of said plurality of control functions.

5. A binary circuit for use with a recording ammeter to adapt said ammeter for use as a monitor of the control condition of a master control device, comprising: a master control device having a plurality of control conductors, said control conductors divided into two groups, said master control device adapted to simultaneously energize a control conductor in each said group; a like plurality of current admitting paths also divided into two groups corresponding to said two groups of control conductors; a recording ammeter; said current admitting paths connected between said control conductors and said ammeter, the first group of current admitting paths monitoring a first control function and adapted in successively binary control conditions to permit successively larger arithmetic increments of current flow to said recording ammeter, the second group of current admitting paths monitoring a second control function and adapted in successive binary control conditions to permit successively larger arithmetic increments of current flow to said meter, the largest of the latter mentioned increments being smaller than the smallest of the first mentioned increments; each of said current admitting paths controlled from said master control device upon energization of the control conductors; and a function and control condition identifying means forming part of said ammeter for indicating the current flow received by said ammeter.

6. A control circuit permitting simultaneous indication of the condition of two pluralities of control channels on a single channel meter, including in combination: a first and a second plurality of control channels; means for supplying a control current connected to said first and second plurality of control channels; a single channel meter; a circuit connected between said meter and said means for supplying a control current having means for admitting different discrete amounts of control current to flow through said meter for each condition of said first plurality of control channels, said circuit also having means for concurrently admitting other different discrete amounts of current to flow through said meter for each condition of said second plurality of control channels, the latter different discrete amounts of current being different from the former different discrete amounts of current; a meter movement in said meter adapted to receive said current flows and to add same through said meter; and a scale of indications adjacent said meter movement for indicating the concurrent condition of said two pluralities of control channels.

References Cited in the file of this patent
UNITED STATES PATENTS

| | | |
|---|---|---|
| 2,098,227 | Chauveau | Nov. 9, 1937 |
| 2,622,141 | Aberman | Dec. 16, 1952 |
| 2,685,084 | Lippel et al. | July 27, 1954 |
| 2,738,504 | Gray | Mar. 13, 1956 |
| 2,883,644 | Barker | Apr. 21, 1959 |
| 2,892,147 | Bell | June 21, 1959 |